E. S. BLAIR.
Horse-Racks.

No. 205,522.  Patented July 2, 1878.

Witnesses:
Theodore Mungen
John O'Donoghue

Inventor:
E. S. Blair
By H. J. Ennis, atty.

UNITED STATES PATENT OFFICE.

ELIJAH S. BLAIR, OF WILKESBOROUGH, NORTH CAROLINA.

IMPROVEMENT IN HORSE-RACKS.

Specification forming part of Letters Patent No. 205,522, dated July 2, 1878; application filed April 29, 1878.

*To all whom it may concern:*

Be it known that I, ELIJAH S. BLAIR, of Wilkesborough, in the county of Wilkes and State of North Carolina, have invented certain new and useful Improvements in Horse-Racks; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
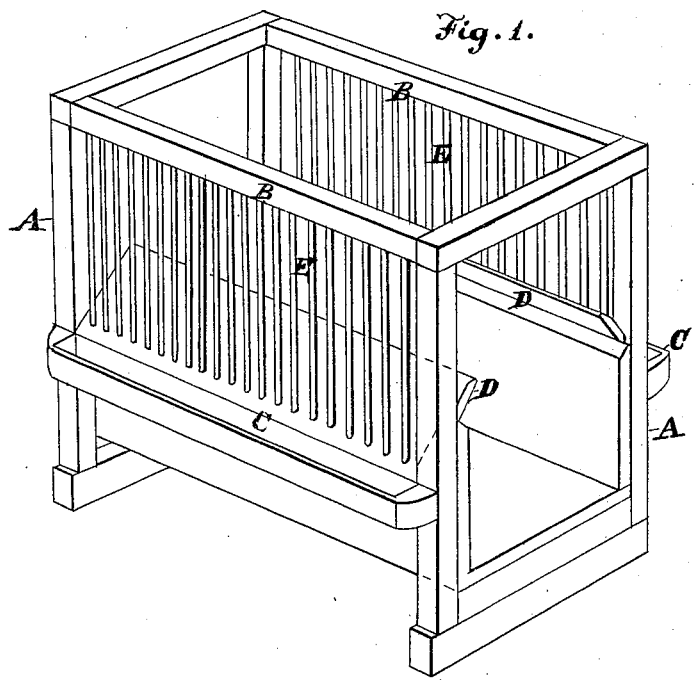
Figure 2:
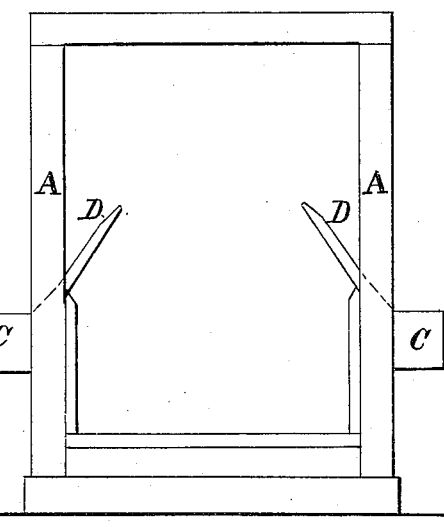

Figure 1 is a view, in perspective, of a hay-rack embodying the improvements of my invention. Fig. 2 is an end elevation of same.

This invention relates to an improvement in hay-racks usually erected in the stable in which the horses are stalled and fed; and it consists of a series of perpendicular bars, the upper ends of which are secured in a top rail and their lower ends in an inclined bottom board, which connects at its lower forward edge with the upper rear edge of a feed box or trough, which extends the entire length of the hay-rack, for the purpose of preventing the hay-seed from falling on the floor by conducting it to the feed-trough by means of the inclined bottom of the rack, where it may be readily eaten by the horse, and a considerable waste thus prevented, all of which will be hereinafter more fully described, and particularly pointed out in the claim.

In the accompanying drawings similar letters of reference indicate like parts of the invention.

In this instance two racks are shown, one opposite the other, with a passage between.

A A are uprights, which support the rack and feed box or trough C. B B are the top rails, which receive the upper ends of the series of vertical bars E. C is the feed box or trough, which is secured to the upright A at the front lower edge of the inclined bottom D of the rack.

In the rack heretofore made the bars E have been inclined from top to bottom, and have receded from the horse's head. Consequently when the hay has been placed in the hay-rack the hay-seed has been permitted to fall into the eyes of the animal, and also to the ground, and there to be wasted, and the horse, in his efforts to draw the hay from the rack, has only increased the danger to his eyes and continued the waste.

By making the bars E perpendicular, these defects are obviated, and the hay-seed, when shaken loose, now falls upon the inclined bottom D, and is by it conveyed to the trough C, where the horse can readily eat it.

This construction therefore protects the animal's eyes from being endangered by the hay-seed, and also saves that which has heretofore been wasted.

I am aware that a hay-rack having a series of perpendicular bars and an inclined bottom has heretofore been employed in connection with a feed-trough having a perforated bottom lying over a drawer, as shown in Letters Patent granted to R. A. Campbell, dated November 16, 1858, No. 22,062, and I therefore lay no claim to such invention.

In my construction the bottom of the feed-trough is imperforated, and the inclined plane or bottom of the hay-receptacle terminates at its lower end along the upper inner edge of the feed-trough, thus conducting by gravity the hay-seed directly into the trough, to be eaten by the horse or other animal.

Having thus described my invention, what I claim as new and useful, and desire to secure by Letters Patent of the United States, is—

The hay-rack herein described, consisting of the perpendicular bars E, short inclined bottom D, terminating along the upper inner edge of the trough, and feed-trough C, having an imperforated bottom, whereby the hay-seed is forced by gravity down the inclined bottom directly into the feed-trough, to be eaten by the animal, as set forth.

In testimony that I claim the foregoing as my own I hereby affix my signature in presence of two witnesses.

E. S. BLAIR.

Witnesses:
  I. S. CALL,
  ROBERT S. PORDEW.